(12) United States Patent
Barg et al.

(10) Patent No.: US 10,487,794 B2
(45) Date of Patent: Nov. 26, 2019

(54) POWER GENERATION SYSTEMS, AND RELATED METHODS, COMPONENTS AND CONTROL SYSTEMS

(71) Applicants: COMMUNITY HYDRO, LLC, Plainfield, VT (US); Lori Barg, Plainfield, VT (US)

(72) Inventors: Lori Barg, Plainfield, VT (US); Allan Chertok, Bedford, MA (US)

(73) Assignee: COMMUNITY HYDRO, LLC, Plainfield, VT (US)

( * ) Notice: Subject to any disclaimer, the term of this patent is extended or adjusted under 35 U.S.C. 154(b) by 61 days.

(21) Appl. No.: 15/763,487

(22) PCT Filed: Oct. 24, 2016

(86) PCT No.: PCT/US2016/058530
§ 371 (c)(1),
(2) Date: Mar. 27, 2018

(87) PCT Pub. No.: WO2017/070697
PCT Pub. Date: Apr. 27, 2017

(65) Prior Publication Data
US 2018/0266383 A1    Sep. 20, 2018

Related U.S. Application Data

(60) Provisional application No. 62/409,262, filed on Oct. 17, 2016, provisional application No. 62/244,870, filed on Oct. 22, 2015.

(51) Int. Cl.
| | | |
|---|---|---|
| F03B 13/08 | (2006.01) | |
| F03B 15/04 | (2006.01) | |
| F03B 3/06  | (2006.01) | |
| F03B 15/14 | (2006.01) | |
| F03B 15/16 | (2006.01) | |
| F03B 3/04  | (2006.01) | |
| F03B 15/08 | (2006.01) | |

(52) U.S. Cl.
CPC ............... *F03B 13/08* (2013.01); *F03B 3/04* (2013.01); *F03B 3/06* (2013.01); *F03B 15/04* (2013.01);
(Continued)

(58) Field of Classification Search
CPC .. F03B 13/08; F03B 15/08; F03B 3/04; F03B 15/16; F03B 3/14; F03B 15/14;
(Continued)

(56) References Cited

U.S. PATENT DOCUMENTS

| 2,949,540 A | 8/1960 | Clayton |
|---|---|---|
| 4,182,123 A | 1/1980 | Ueda |

(Continued)

OTHER PUBLICATIONS

International Search Report Corresponding to PCT/US2016/058530 dated Feb. 6, 2017.
(Continued)

*Primary Examiner* — Eldon T Brockman
(74) *Attorney, Agent, or Firm* — Davis & Bujold PLLC; Michael J. Bujold

(57) ABSTRACT

A system for generating power from a flow of liquid having at most fifty feet of head and a flow rate of at most 300 cubic feet per second, includes: an axial-flow turbine, a penstock, an intake, a generator, and a control circuit. Each blade of the turbine runner is releasably coupled to the hub and each blade: 1) is configured to extract energy from liquid flowing through the runner by rotating the hub when the flow of liquid contacts the blade, and 2) has a pitch that is adjustable. The length of the penstock is adjustable. The generator is operable to generate electric power from rotation of the turbine. The control circuit to determines changes in the flow of liquid and in response modifies at least one of the following: 1) the speed of the axial-flow turbine's hub, and 2) the flow of liquid that the runner receives.

20 Claims, 8 Drawing Sheets

(52) U.S. Cl.
CPC .............. *F03B 15/08* (2013.01); *F03B 15/14* (2013.01); *F03B 15/16* (2013.01); *F05B 2270/20* (2013.01); *Y02E 10/22* (2013.01); *Y02E 10/226* (2013.01)

(58) Field of Classification Search
CPC ........ F03B 3/06; F03B 15/04; F05B 2270/20; Y02E 10/226; Y02E 10/22
See application file for complete search history.

(56) References Cited

U.S. PATENT DOCUMENTS

| | | |
|---|---|---|
| 4,467,216 A | 8/1984 | Murphy |
| 4,629,904 A | 12/1986 | Rojo, Jr. et al. |
| 4,674,279 A | 6/1987 | Ali et al. |
| 5,754,446 A | 5/1998 | Fisher, Jr. et al. |
| 6,441,508 B1 * | 8/2002 | Hylton ............ F03B 3/02 290/52 |
| 2011/0133464 A1 | 6/2011 | Jankel |
| 2012/0146330 A1 | 6/2012 | Shifrin et al. |
| 2012/0169054 A1 | 7/2012 | Roos |
| 2015/0033722 A1 | 2/2015 | Layton et al. |

OTHER PUBLICATIONS

Written Opinion Corresponding to PCT/US2016/058530 dated Feb. 6, 2017.
European Search Report issued in corresponding European Patent Application No. 16858458.9 dated Mar. 19, 2019.

* cited by examiner

POWER GENERATION SYSTEMS, AND RELATED METHODS, COMPONENTS AND CONTROL SYSTEMS

CROSS REFERENCE TO RELATED APPLICATION AND CLAIM OF PRIORITY

This application claims priority from commonly owned U.S. Provisional Patent Applications 62/244,870 filed 22 Oct. 2015 titled "HYDRO PLUG AND PLAY POWER GENERATION SYSTEM, AND RELATED METHODS AND COMPONENTS", and 62/409,262 filed 17 Oct. 2016 titled "METHODS AND RELATED CIRCUITS FOR DETECTING AN ISLAND CONDITION IN A POWER DISTRIBUTION NETWORK". Both are incorporated by reference.

BACKGROUND

Hydropower is a large renewable energy contributor to the global production of electricity. Unfortunately, though, there are many small, low-head sites that do not have any power generation equipment generating power from water flowing through the site. A reason for this is the value of the power to be generated at these sites is not enough to justify the cost to design and install a power generation system specifically for that particular site. Because these sites are small and the available water has a low head, typically thirty feet or less, the amount of power that can be generated is low compared to large hydro-electric dams. And, the cost to design and install a power generation system is typically high because most power generation systems are specifically designed for the specific conditions of the water flow including its total head (vertical drop) experienced at the specific site. Most hydro turbines operate at a constant speed that is dictated by the generator and desired frequency of the AC power to be generated. Because each site has a unique set of flow conditions, each turbine and generator set is specifically designed to operate in the unique flow and head conditions of the specific site. Adding to the high cost is the reality that many of the small, low-head dams or natural drops do not have the civil works—particularly an intake—that would allow one to easily add a penstock, turbine and generator set to the water that flows over the dam. To add a power generation system to these sites one would also have to do significant work to the existing dam structure to enable the water to enter the power generation system. The work to build an intake is particularly high-risk and expensive. So, often it doesn't make economic sense to design and install a unique power generation system for a site that can't produce a large amount of power.

Thus, there is a need for a power generation system that can efficiently extract energy from a variety of different flow characteristics in a liquid so that a single system may be used to generate power from a variety of different sites, and a single system may be used to generate power from a single site having a variety of different flow characteristics. There is also a need for a system that is easily installed with minimal civil works, self-cleaning or has an easily cleaned intake; has reduced operation and maintenance requirements and uses power electronics.

SUMMARY

In an aspect of the invention, a system for generating power from a flow of liquid having at most fifty feet of head and a flow rate of at most 300 cubic feet per second, includes: an axial-flow turbine, a penstock, an intake, a generator, and a control circuit. The axial-flow turbine includes a runner that has a hub and a plurality of blades. Each blade is releasably coupled to the hub and each blade: 1) being configured to extract energy from liquid flowing through the runner by rotating the hub when the flow of liquid contacts the blade, and 2) having a pitch that is adjustable for the specific flow conditions of the site. The penstock is operable to direct a flow of liquid toward the runner, and has a length that is adjustable. The intake is operable to direct a flow of liquid into the penstock. The generator is coupled to the hub of the turbine's runner and is operable to generate electric power from the rotation of the turbine's hub. And, the control circuit is operable to determine changes in the flow of liquid, and in response to a determined change in the flow, modify at least one of the following: 1) the speed of the axial-flow turbine's hub, and 2) the flow of liquid that the runner receives.

With the system one can extract energy from flowing liquid that has a range of flow conditions, and thus allow one to use the system at a variety of different sites without the need for extensive modification of civil works, each providing flowing liquid that has a set of flow and civil work conditions different than the other sites. In other words, one can use the same system to economically extract energy from the flowing liquid at a variety of different sites without extensive and expensive civil works. To do this, the control circuit modifies the speed of the turbine's runner 32 and/or the flow 18 of the liquid through the turbine 22 to modify the turbine's performance to allow the turbine 22 to efficiently extract energy from the flow conditions at the specific site. In addition, by releasably coupling the turbine's blades to the turbine's hub, one can further modify the turbine to operate in a wide range of different flow conditions by adjusting the pitch of the blades or replacing them with other blades better matched to current head conditions. And, by making the pitch of the turbine's blades 36 adjustable, one can set the pitch of the blades 36 as desired to efficiently extract energy from the specific flow conditions of a variety of different sites. Also, the ability to have no forebay, or a pressurized or non-pressurized forebay, a screened U-channel intake, and a telescoping adjustable length penstock and pipe, make the civil works affordable and easy to retrofit to existing dams and drops.

In another aspect of the invention, a method for generating power from a flow of liquid having at most fifty feet of head and a flow rate of at most 300 cubic feet per second, includes positioning a turbine system in a flow of liquid having at most fifty feet of head and a flow rate of at most 300 cubic feet per second. The turbine system includes an axial-flow turbine that has a runner that includes a hub and a plurality of blades. Each of the blades is releasably coupled to the hub and each of the blades has a pitch that is adjustable. The method also includes 1) directing, with an intake of the turbine system, a flow of liquid into a penstock of the turbine system, 2) directing, with the penstock, the flow of liquid from the intake toward the runner of the axial-flow turbine, 3) rotating the runner's hub with the flow of liquid, 4) generating power with a generator that is included in the turbine system and coupled to the runner's hub, 5) monitoring the flow of liquid through the penstock for a change in the flow; and 6) in response to a change in the flow, modifying at least one of the following: the speed of the axial-flow turbine's hub, and the flow of liquid that the runner receives.

Figure 3:
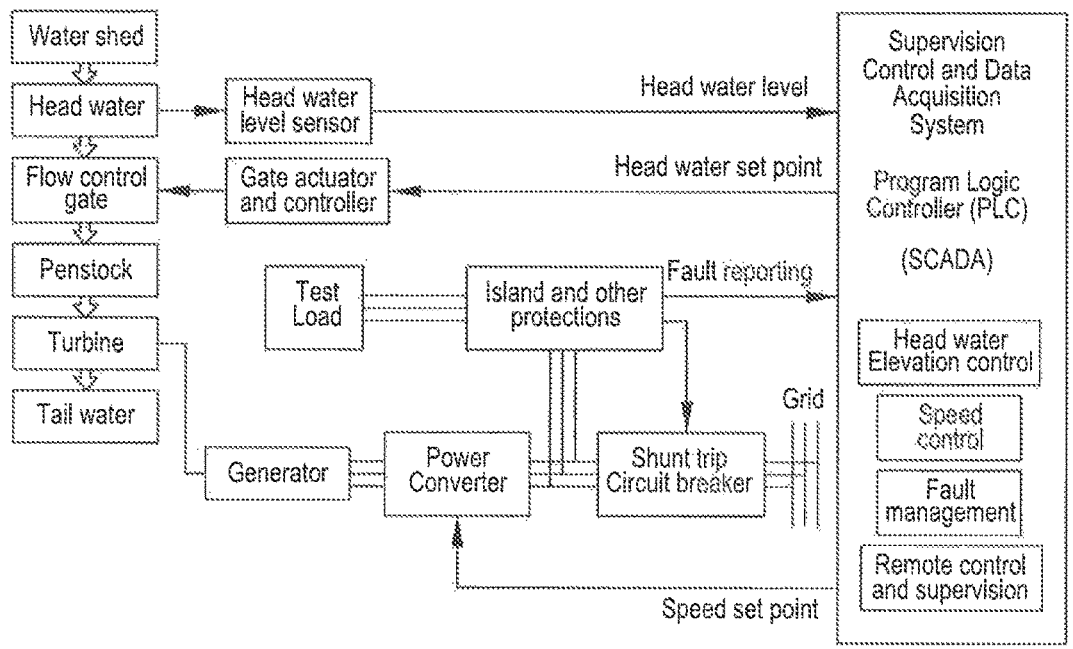
Figure 4:
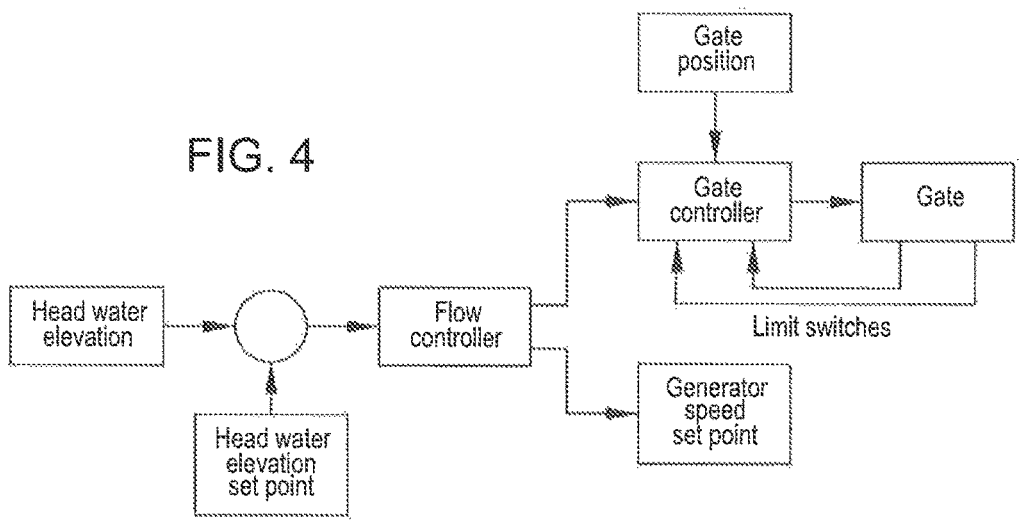

Each of FIGS. 3 and 4 shows a block diagram of a control circuit, each according to another embodiment of the invention.

Figure 1:
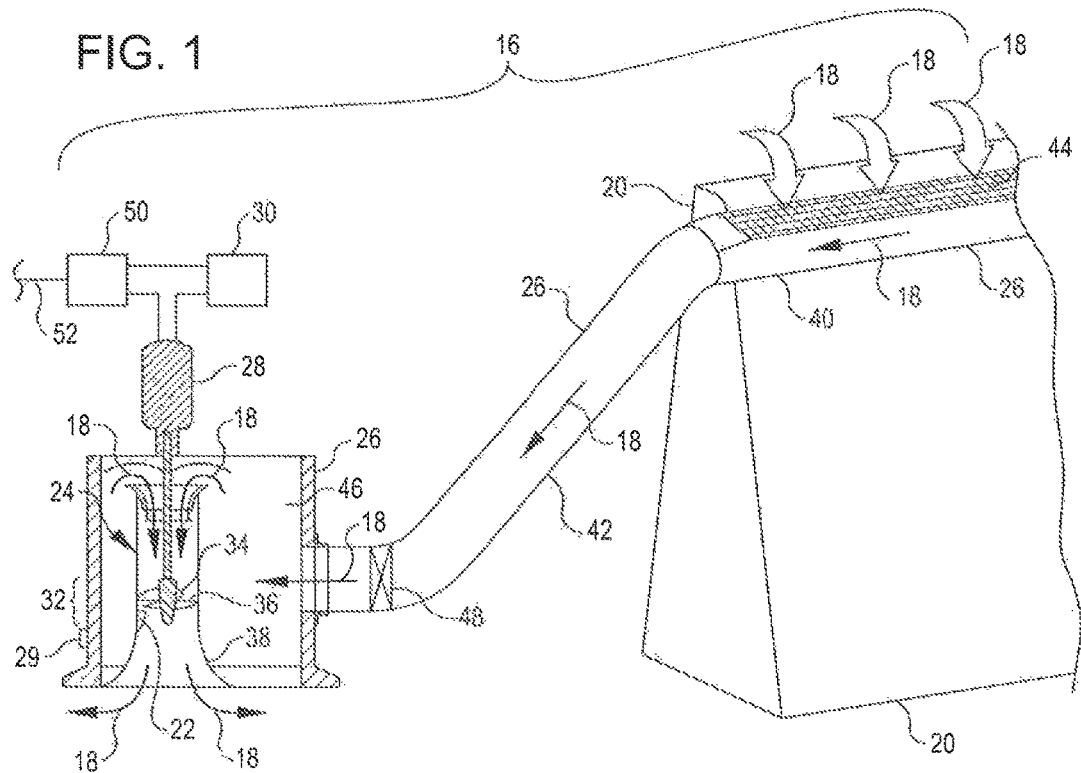
FIG. 1 shows a perspective, cross-sectional view of a power generation system, according to an embodiment of the invention.
Figure 5:
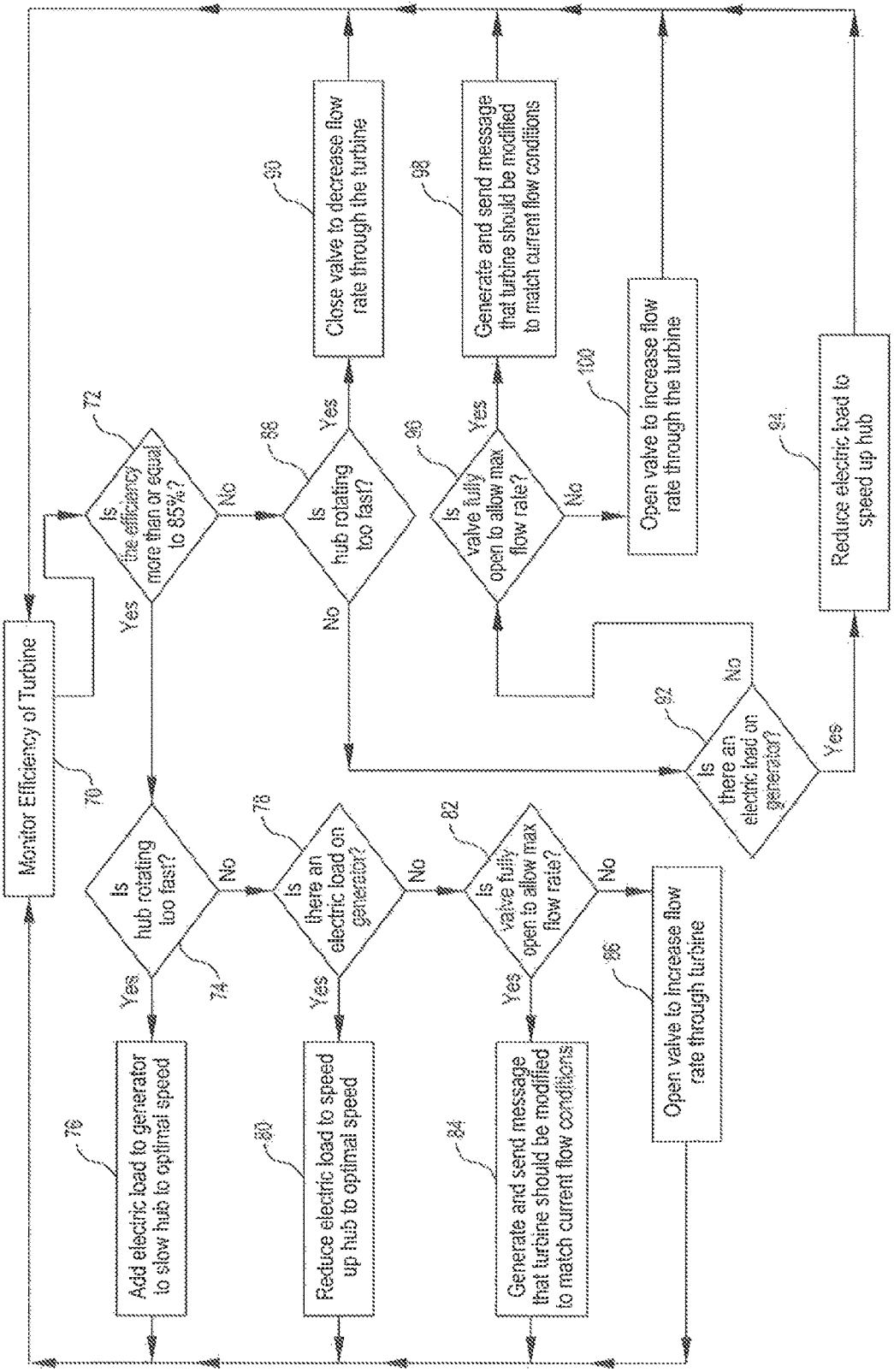

FIG. 5 shows a process for monitoring and controlling the efficiency of a turbine included in the power generation system shown in FIG. 1, according to an embodiment of the invention.

Figure 6:
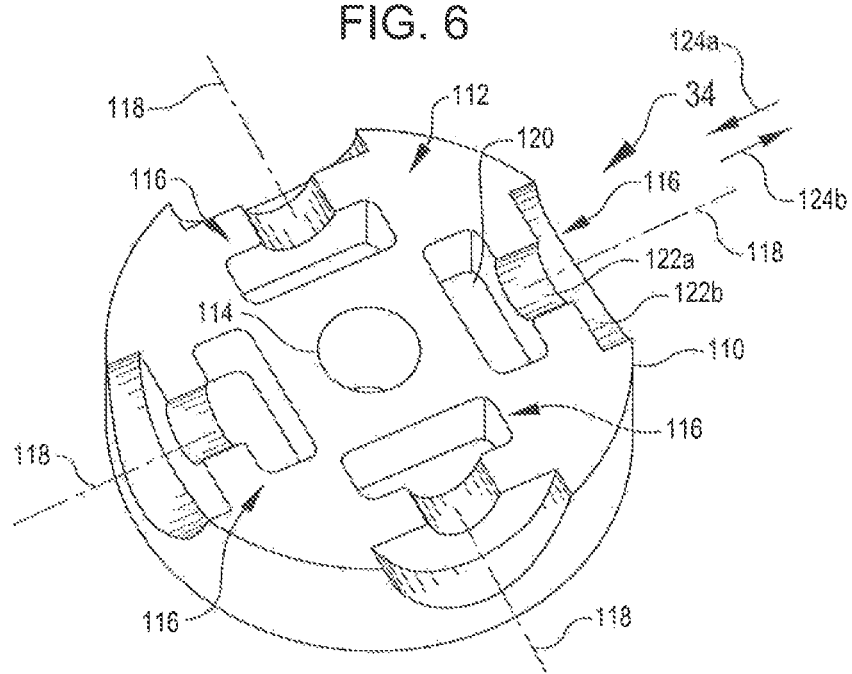

FIG. 6 shows a perspective view of a portion of a hub of a turbine included in the power generation system shown in FIG. 1 that may releasably couple a turbine blade to a hub of the turbine component, according to an embodiment of the invention.

Figure 7:
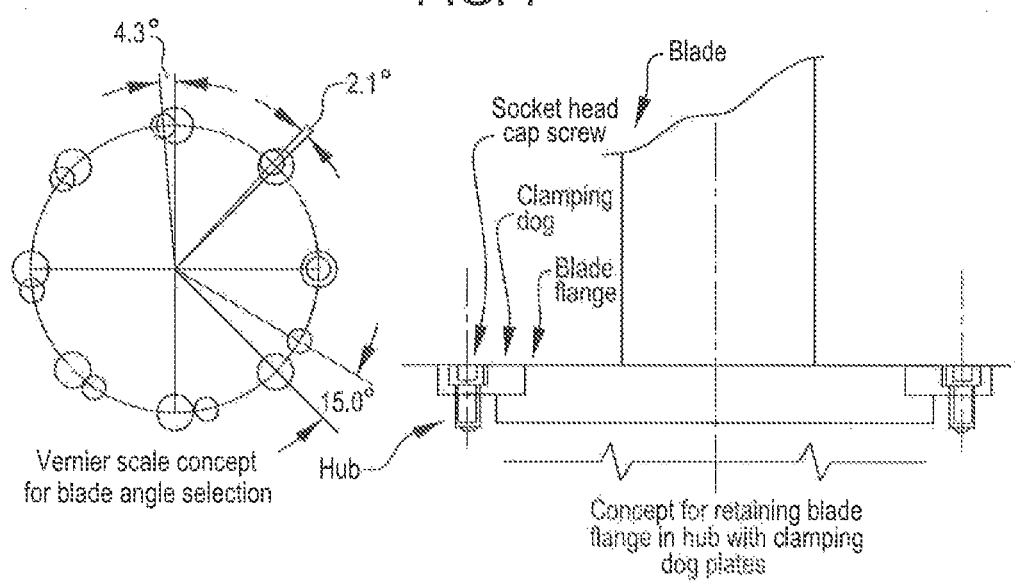

FIG. 7 shows a blade releasably mounted to a hub such that one can manually adjust the pitch of the blade in about two-degree increments within a range of about twenty-four degrees, according to an embodiment of the invention.

Figure 8:
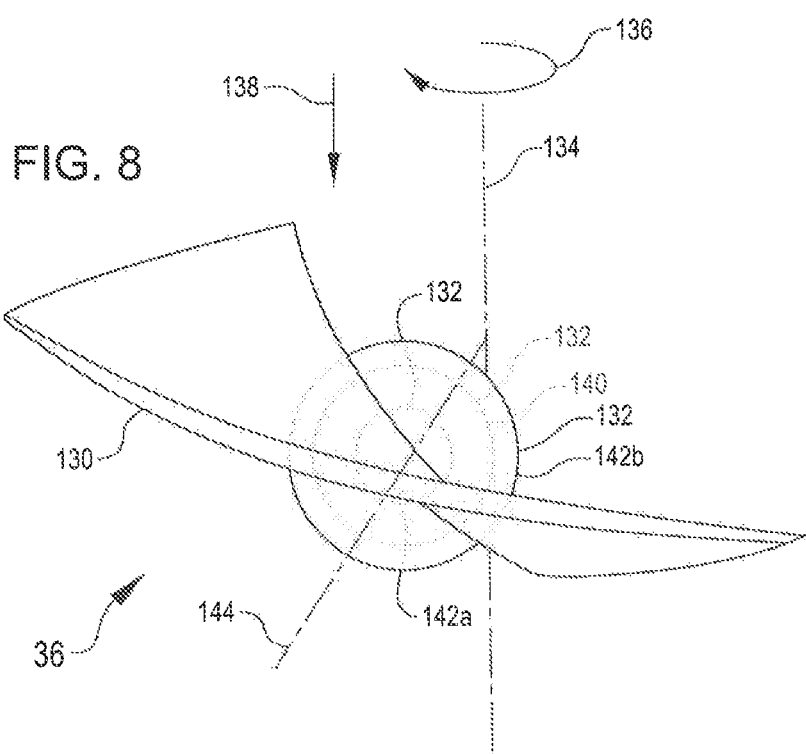

FIG. 8 shows a perspective view of a turbine blade of a turbine included in the power generation system shown in FIG. 1, according to an embodiment of the invention.

Figure 9:
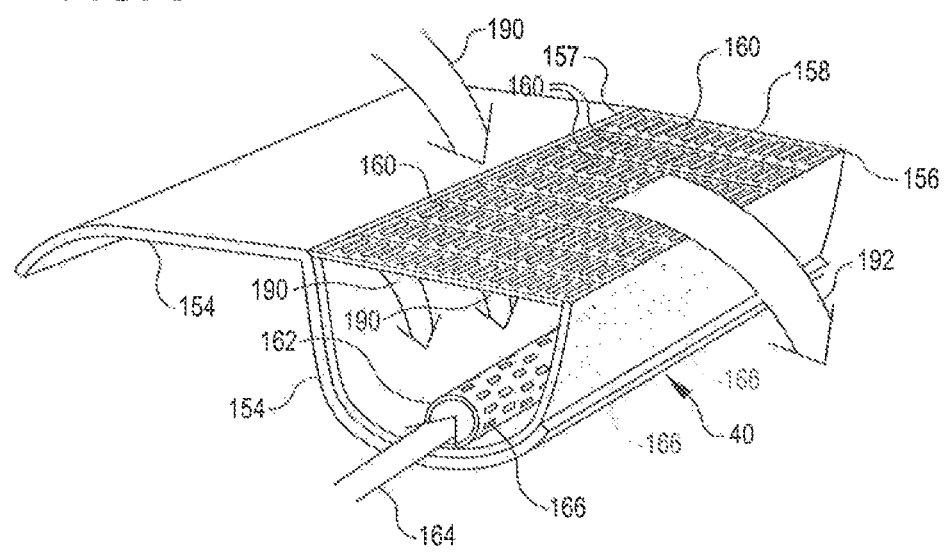

FIG. 9 shows a perspective view of an intake included in the power generation system shown in FIG. 1, according to an embodiment of the invention.

Figure 10:
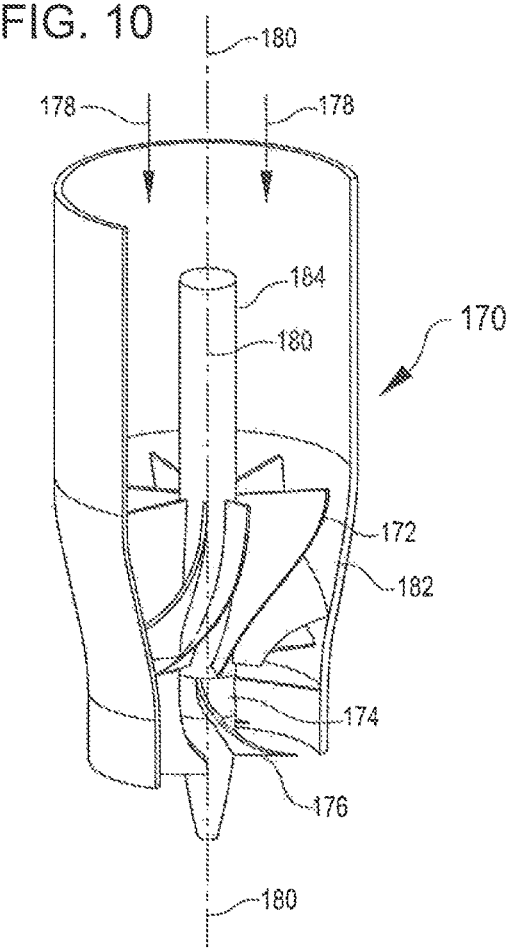

FIG. 10 shows a perspective, cross-sectional, partial view of a penstock, according to another embodiment of the invention.

Figure 11A:
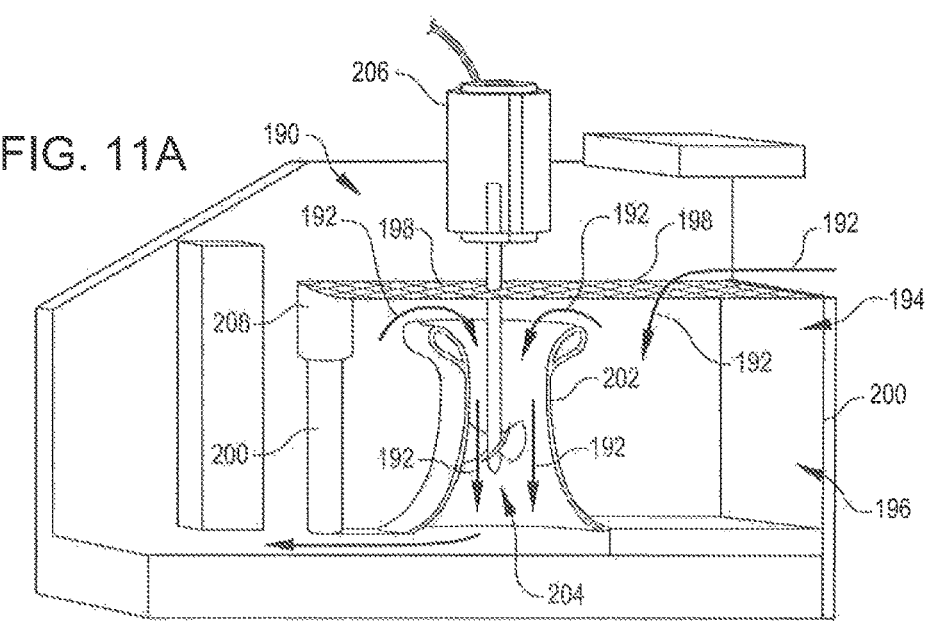

FIG. 11A shows a partial cross-sectional view of yet another power generation system, according to yet another embodiment of the invention.

Figure 11B:
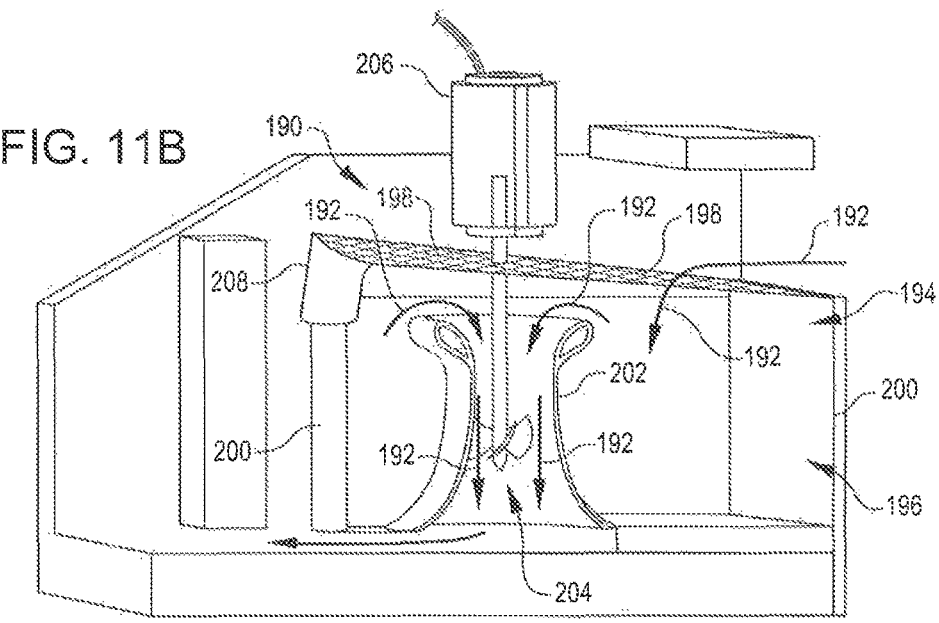

FIG. 11B shows another partial cross-sectional view of the power generation system shown in FIG. 11A, according to yet another embodiment of the invention.

Figure 12:
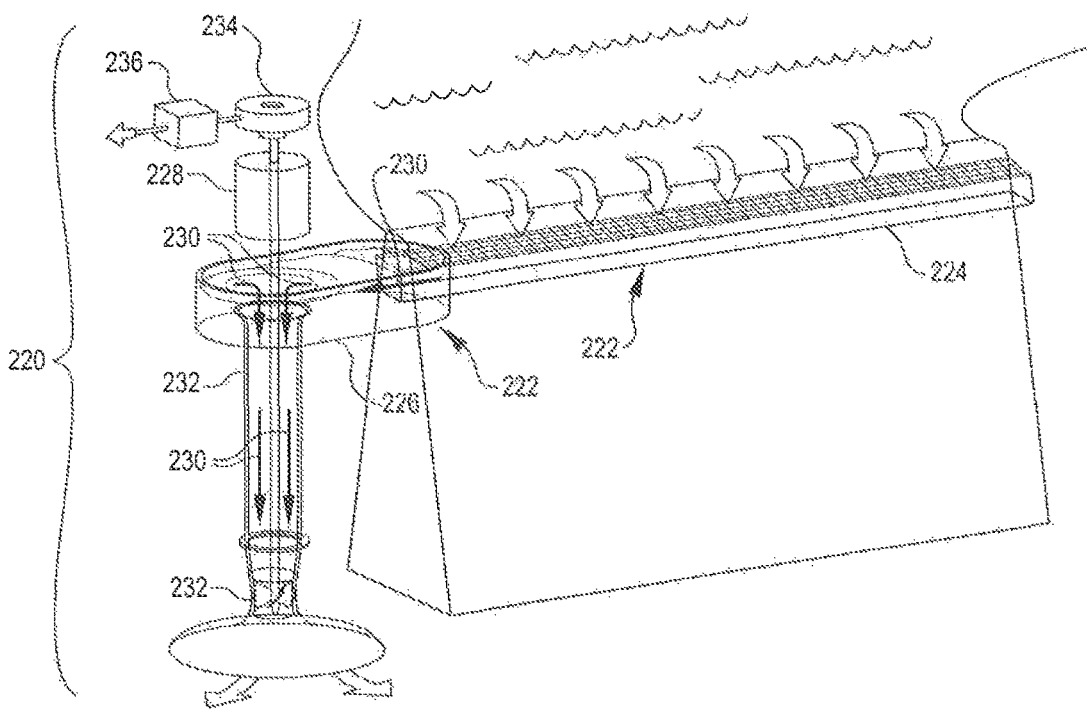

FIG. 12 shows a perspective view of another power generation system, according to another embodiment of the invention.

Figure 13:
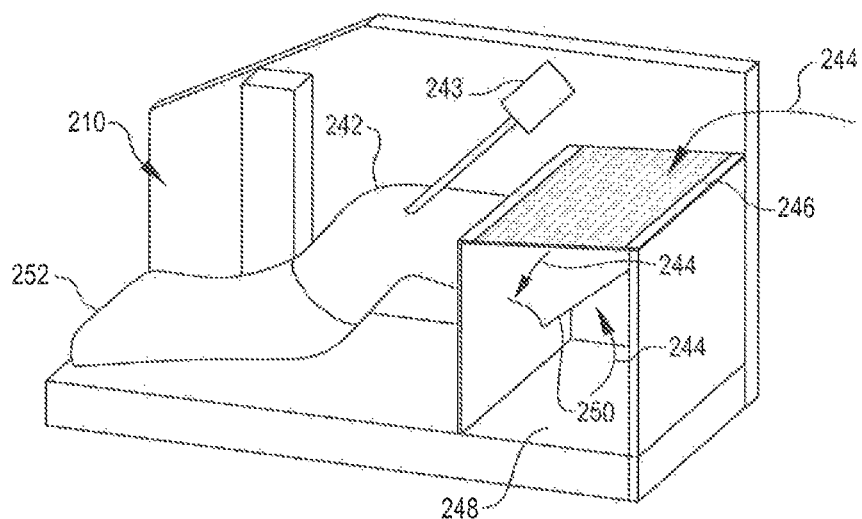

FIG. 13 shows a perspective view of another power generation system, according to another embodiment of the invention.

Figure 14:
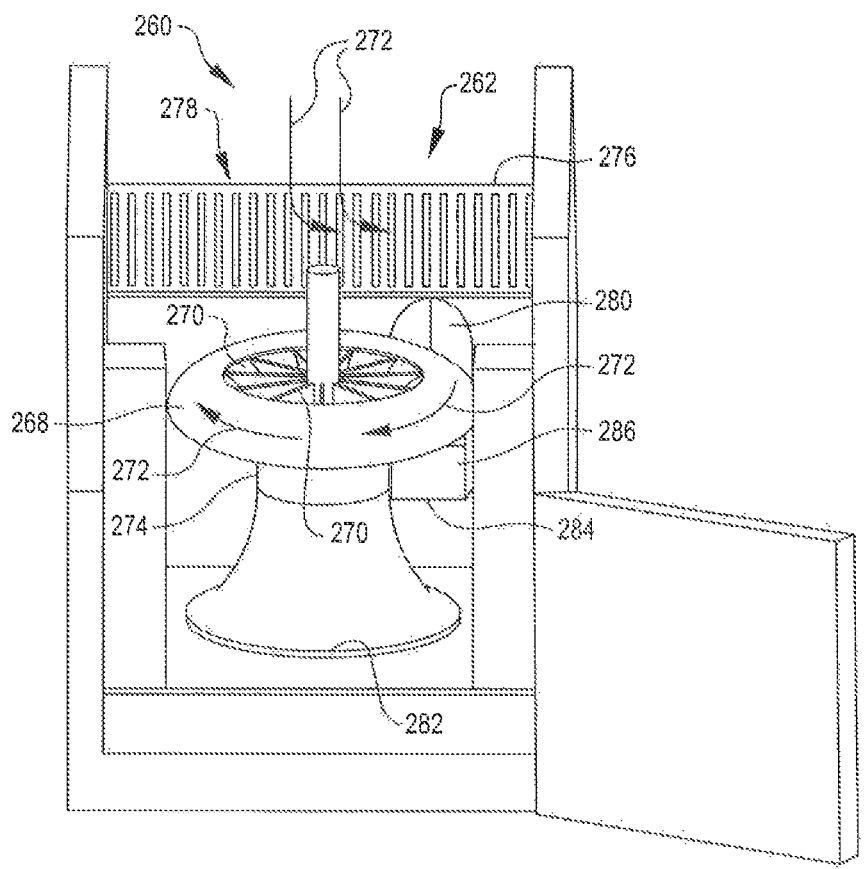

FIG. 14 shows a perspective view of still another power generation system, according to another embodiment of the invention.

DETAILED DESCRIPTION

FIG. 1 shows a perspective, partial cross-sectional view of a power generation system 16, according to an embodiment of the invention. The system 16 is designed to generate electric power from flowing liquid 18, here water flowing over a dam 20 but may be a flow of any other desired liquid. Specifically, the system 16 is designed to generate electric power from liquid 18 having up to fifty feet of head (about 3,121 pounds per square foot, or 21.65 pounds per square inch) or less, and flowing at 300 cubic feet per second (cfs) or less. Although a single system 16 is shown, two or more such systems may be used together to generate electric power. The power generation system 16 includes an axial-flow turbine 22, a penstock 24, an intake 26, a generator 28, and a control circuit 30. The axial-flow turbine 22 (discussed in greater detail in conjunction with FIGS. 6-8) includes a runner 32 that has a hub 34 and a plurality of blades 36. Each of the blades 36 is releasably coupled to the hub 34 and designed to efficiently extract energy from the flowing liquid 18 when the flow 18 has a specific range of conditions within the range stated above. In addition, the pitch of each blade 36 is adjustable for the flow conditions of a specific site. The blade pitch is the blade angle at which the flowing liquid 18 hits the blade 36—the blade's angle of attack. So, when the conditions of the flowing liquid 18 change and lie outside the specific range of conditions that the turbine 22 is designed for, one does not modify the amount of power generated by the turbine 22 by changing each blade's pitch to increase the efficiency of the turbine 22. Instead, the control circuit 30 (discussed in greater detail in conjunction with FIGS. 2-5) determines changes in the flow of liquid 18, and in response modifies, while the turbine's runner 32 rotates, the following to increase the turbine's efficiency: 1) the speed of the turbine's runner 32 by adding or subtracting an electric load (not shown in FIG. 1) to the generator 28, 2) the flow of liquid 18 through the runner 32, or 3) both. The penstock 24 (discussed in greater detail below and in conjunction with FIG. 7) directs the flow of liquid 18 toward the runner 32, and has a length that is adjustable. The intake 26 (discussed in greater detail in conjunction with FIG. 6) directs the flow of liquid 18 into the penstock 24. And, the generator 28 generates electric power from the rotation of the turbine's runner 32.

By modifying the speed of the turbine's runner 32 and/or the flow 18 of the liquid through the turbine 22, one can modify the turbine's performance within a set of flow conditions that are close to the specific range of flow conditions that the turbine 22 is designed for, to allow the turbine 22 to efficiently extract energy from the new flow conditions, which may be governed by operational regulations. This allows one to efficiently generate power from flowing liquid whose flow conditions may change, such as the flow from a dam used by a farmer to irrigate his crops, or the flow of a stream or river that changes as the season changes. In addition, by making each of the blades releasably coupled to the turbine's hub 32, one can modify a single turbine 22 to operate in a wide range of different flow conditions by replacing the blades designed to efficiently extract energy from one specific range of flow conditions with other blades designed to efficiently extract energy from a different specific range of flow conditions. And, by making the pitch of the turbine's blades 36 manually adjustable, one can set the pitch of the blades 36 as desired to efficiently extract energy from the specific flow conditions of a variety of different sites. In other words, with the control circuit 30, one can modify the performance of the turbine 22 in response to changes in the conditions of the flow 18 while the turbine's runner 32 rotates, and with the ability to easily substitute blades 36 having one pitch for blades 18 having another pitch, one can modify the same turbine 22 in response to a large change in the conditions of the flow 18. With this ability to use the same turbine 22 for a variety of flow conditions ranging from 3 to 50 feet of head, and 1 to 300 cfs, one can easily and efficiently use the system 18 to generate electric power from a variety of different flow conditions and civil work conditions—e.g., a variety of different dams and streams/rivers/canals/tidal-zones—that otherwise would not be economically viable. The ability to have no forebay, or a pressurized or non-pressurized forebay; a screened U-channel intake and a telescoping adjustable length penstock and pipe 42 make the civil works affordable and easy to retrofit to existing dams and drops.

Other embodiments of the system 16 are possible. For example, FIGS. 8A-11 show different embodiments of the system 16. As another example, the axial flow turbine 22 may be positioned horizontally or at any angle relative to the horizon or level, not vertically as shown in FIG. 1. In addition, the system 16 may be used to generate power from liquid 18 having more than fifty feet of head, and flowing at more than 300 cubic cfs.

Still referring to FIG. 1, the axial-flow turbine 22 may be any desired axial-flow turbine capable of extracting energy from a flow of liquid. For example, in this and other embodiments the turbine 22 is a propeller, semi-Kaplan or Kaplan turbine whose runner 32 includes four blades 36. The blades 36 of the runner 32 extract energy from both the hydrostatic pressure in the flow 18 and the velocity of the flow 18. In other embodiments, the turbine 22 may be a Francis turbine, although Francis turbines are typically designed to extract energy from a flow of liquid having a range of flow conditions that include heads typically greater than 30 feet. In still other embodiments, the turbine 22 may be a Pelton turbine or an impulse-type turbine, instead of a reaction-type turbine. In such embodiments, the system 16 would include a nozzle to convert hydrostatic pressure in the flow 18 into an increase in the flow's velocity.

Still referring to FIG. 1, the penstock 24 may be configured as desired to direct flowing liquid 18 toward the turbine 22. For example, in this and other embodiments, the penstock 24 is designed to generate and maintain laminar flow in the liquid 18 flowing toward the turbine 22. Laminar flow is flow without any mixing, eddies or currents in a direction other than toward the turbine 22. In laminar flow, minimal energy in the flow 18 is lost while the flow 18 travels toward the turbine 22, and thus allows the turbine 22 to extract more energy from the flow 18. The penstock 24 also has a length that is adjustable so that one can provide the same penstock 24 to a variety of different sites each requiring a penstock having a different length. This reduces the total cost for making and installing the system 16, and thus makes the system 16 economically viable for sites that would otherwise not be economically viable. To provide this adjustment in the penstock's length, the penstock 24 has two or more axial sections that telescope relative to each other. In other embodiments, the length of the penstock 24 may be increased by releasably coupling one or more axial sections to the penstock 24, and may be decreased by removing one or more axial sections from the penstock 24.

Similar to the penstock 24, the system 16 also includes an exit 38 that may be configured as desired to allow the turbine 22 to extract as much energy as possible from the flow 18. For example, in this and other embodiments the exit 38 includes a draft tube that recovers residual kinetic energy of the flow 18 that exits the turbine's runner 32. The draft tube does this by uniformly distributing the flow 18 over a larger area perpendicular to the direction of the flow 18. This reduces the flow's velocity and pressure at the turbine's exit, and thus generates a higher head across the turbine's runner 32. In other embodiments, the draft tube may include a hydraucone profile to efficiently recover energy from the flow's rotational motion (swirl) as well as the flow's linear motion. With the hydraucone profile the exit 38 may be shallower or shorter in the direction of the flow 18 than a draft tube without the hydraucone profile.

Still referring to FIG. 1, the intake 26 of the system 16 may be easily mounted to the dam 20 and configured as desired to direct the flow of liquid 18 toward the penstock 24. For example, in this and other embodiments the intake 26 includes a screened U-channel trench 40 (discussed in greater detail in conjunction with FIG. 6) that is coupled to the crest of the dam 20 and pitched to direct liquid 18 that flows into it, toward the pipe 42. The pipe 42 has a length that is adjustable. The U-channel trench 40 includes a screen 44 that allows liquid 18 to flow into the trench 40 while preventing other debris such as leaves, twigs, logs and fish from entering the trench 40. The intake 26 also includes a pressurized forebay 46 to calm the flow 18 before the flow 18 enters the penstock 24. Similar to the penstock 24, the forebay 46 is configured to minimize the loss of energy in the flow 18 as the flow 18 travels toward and into the penstock 24, and includes a clean-out door 29 to either clean out accumulated silt-or to perform other operation and maintenance on the system 16. In addition, the intake 26 includes a valve or gate 48 to modify the flow 18 of liquid that the turbine receives.

In other embodiments of the system 16, the intake 26 may not include a U-channel trench 40 and pipe 42 to direct fluid 18 toward the penstock 24 and turbine 22. In such embodiments, like those shown in FIGS. 8A, 8B, 10 and 11, the forebay 46 may be placed in the spillway of a dam and may or may not be pressurized. If the forebay 46 is not pressurized, then the total head of the flow that the system 16 extracts energy from is substantially equal to the depth of the forebay 46. In contrast, the forebay 46 shown in FIG. 1, is pressurized, i.e. sealed such that the liquid 18 inside the forebay can only leave the forebay by traveling through the penstock 24 and turbine 22. By sealing the forebay, the total head of the flow 18 through the turbine 22 is the difference in elevation between the top of the U-channel trench 40 of the intake 26 and the bottom of the exit 38. This allows a standard size, shorter turbine shaft to be used at higher heads, further reducing costs. In other words, embodiments of the system 16 can include either a pressurized or non-pressurized forebay, which includes a clean-out door to either clean out accumulated silt-or to perform other operation and maintenance on the system.

Still referring to FIG. 1, the generator 28 may be any desired generator capable of generating electric power from the rotation of the turbine runner 32. In this and other embodiments, the generator 28 could include a direct current (DC) generator that generates power having a direct current, or an alternating current (AC) generator that generates power having an alternating current. With a DC generator, changes in the rotational speed of the turbine's runner 32 that may be caused by changes in the conditions of the liquid flowing through the runner 32 only affect the amount of power generated by the generator, not the form of the electric power. For example, if the runner 32 slows because the flow rate of the liquid 18 decreases, then the amount of power generated by the generator 28 decreases, but the power remains as direct current. In contrast, if the runner 32 slows because the flow rate of the liquid 18 decreases, then the amount power generated by an alternating current (AC) generator decreases and the frequency at which the current alternates slows and the amplitude is reduced. In this and other embodiments, the system 16 also includes a power converter 50 which serves to 1) convert generator power developed at variable frequency and/or variable voltage to a constant frequency, voltage and phase format suitable for delivery of power by interconnection to a local, regional or national grid; 2) enable adjustment of turbine and generator speed by control of the generator reaction torque presented to the runner and 3) expedite and minimize cost of obtaining a permit for utility interconnection by assuring grid interface characteristics and protective features certified to utility-recognized standards such as UL1741.

In other embodiments, the converter 50 may be configured to supply power to remote "off-grid" loads such as those presented by a farm, mine, pipe line compressor, or vacation home. An off-grid converter may include battery or other energy storage and possibly input from other sources such as PV solar panels and wind turbines. An off-grid converter would retain the basic functions of the grid-tied version including 1) converting generator power developed at variable frequency and/or variable voltage to a constant frequency, voltage and phase format suitable for delivery of power to off-grid loads and/or battery or other energy storage unit; 2) enabling adjustment of turbine and generator speed by control of the generator reaction torque presented to the runner and 3) expediting and minimizing the cost of obtaining a permit for installation by the Authority Having Jurisdiction (AHJ) by assuring provision of protective features certified to recognized standards such as UL1741.

Figure 2:
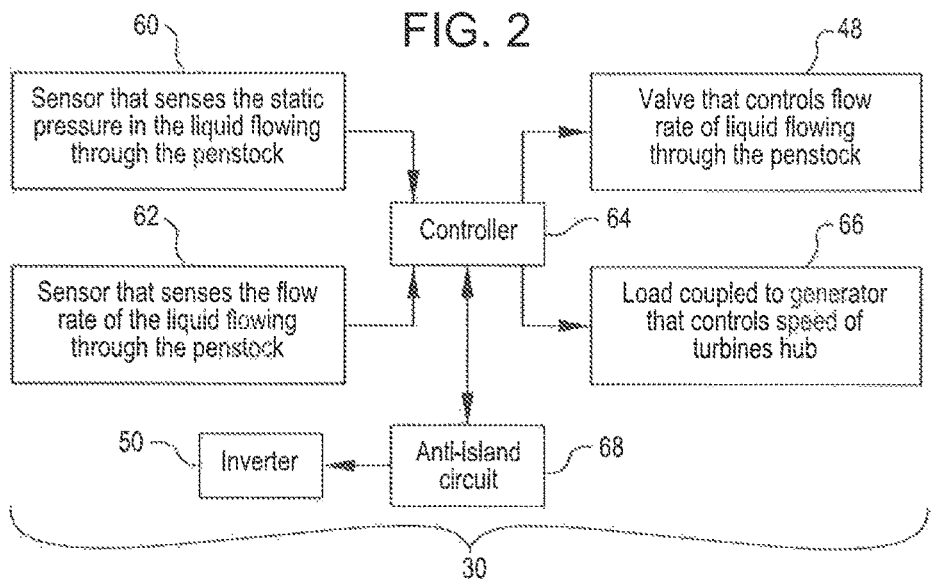
FIG. 2 shows a block diagram of a control circuit included in the power generation system shown in FIG. 1, according to an embodiment of the invention.

FIG. 2 shows a block diagram of a control circuit 30 included in the power generation system 16 shown in FIG. 1, according to an embodiment of the invention. The control circuit 30 monitors one or more operational parameters of the power generation system 16 and modifies, as desired, one or more operational variables to obtain a desired performance from the system 16.

For example, in this and other embodiments, the control circuit 30 monitors at least one of the following: the static pressure of the flow of liquid through the penstock 24 (FIG. 1) and the flow rate of the liquid through the penstock. If the either or both of these flow characteristics is not as desired, then in response, the control circuit 30 modifies, while the turbine's runner 32 rotates, at least one of the following to increase the turbine's efficiency, and thus the amount of power generated by the turbine: 1) the speed of the turbine's runner 32 by adding or subtracting an electric load to the generator 28 thereby increasing or decreasing the generator reaction torque presented to the runner 32, 2) the flow of liquid 18 through the runner 32, or 3) both. The control circuit 30 includes a sensor 60 that measures the static pressure of the liquid in the penstock 24, and another sensor 62 that measures the flow rate of the liquid flowing through the penstock 24. The control circuit 30 also includes a controller 64 that receives a signal from each of the sensors 60 and 62 that represents the static pressure and flow rate, respectively, then compares this signal with a predetermined, desired signal, and determines whether or not the static pressure and flow rate, respectively, dropped, rose or remained the same. Based on this determination and as discussed in greater detail in conjunction with FIG. 3, the controller 64 then instructs either the valve 48 to move to increase or decrease the current flow of liquid through the penstock 24, or an electric load 66 to be added to or removed from the generator, or both. The electric load 66 may be a resistor or any other component or circuit that consumes power.

In other embodiments, the control circuit 30 may monitor the rotational speed of the runner 22, compare the rotational speed with the optimal, desired range of speeds of the runner 22, and determine whether or not the runner 26 rotates within the optimal, desired range of speeds to maximize power generation. Then, based on this determination, the control circuit 30 may further monitor at least one of the following: the static pressure of the flow of liquid through the penstock 24 (FIG. 1) and the flow rate of the liquid through the penstock to determine why the runner's rotation is not within the desired range of speeds. If either or both of these flow characteristics are not as desired, then in response, the control circuit 30 may modify, while the turbine's runner 32 rotates, at least one of the following to increase the turbine's efficiency, and thus the amount of power generated by the turbine: 1) the speed of the turbine's runner 32 by adding or subtracting an electric load to the generator 28, 2) the flow of liquid 18 through the runner 32, or 3) both.

Still referring to FIG. 2, the control circuit 30 may also include an anti-island circuit 68 as desired. Islanding is a situation where power from a generator continues to power a distribution grid after the main source of power for the grid is disconnected from the grid. This can happen when a local utility disables power to a section of its grid to repair a downed line, and/or maintain a component coupled to the grid. Such an island condition can be very dangerous because a person working on the grid operates under the assumption that the grid is dead, and can receive a deadly dose of electric power provided by a peripheral generator. To address this situation, the control circuit 30 also includes an anti-island circuit 68 that tests for an island condition, and in response to its existence, disconnects the generator 28 from the grid. The circuit 30 determines the existence of an island condition by monitoring the power output from the converter 50. For example, in this and other embodiments, the anti-island circuit 68 monitors the voltage and frequency of the power output from the converter 50. If at the instant of grid interruption the island load demand differs significantly from the converter output voltage and frequency fluctuations larger than normal will occur and can be detected by conventional over/under voltage or over/under frequency protective relays which will disconnect the converter from the grid. However, if the island load is very nearly equal to the converter output only very small output voltage, frequency and or phase disturbances will result. To accommodate this circumstance the converter is also provided with a very sensitive voltage disturbance relay—and possibly sensitive relays responding to frequency and/or phase disturbances. To avoid excessive false (aka "nuisance") alarms due to the high sensitivity of these relays and frequent unnecessary converter disconnection a potential island condition indicated by one or more of these sensitive relays will first apply a test load to the converter output. If the grid is still connected it will support the additional load, no significant further disturbance will be detected and the alarm condition can be ignored. However, if the grid connection has been severed then addition of the test load will produce a significant disturbance and this indication can be used to disconnect the converter output from the grid with confidence that an island condition exists.

FIGS. 3 and 4 show control circuits 67 and 69, respectively, each according to another embodiment of the invention. The circuits 67 and 69 are similar to the circuit 30 shown in FIG. 2, except both circuits 67 and 69 monitor the static pressure of the liquid at the upper water elevation of the U-channel trench 40 of intake 26 and the head water level to monitor flow over the dam. Then, in response to changes in these parameters, the circuits 67 and 69 modify, while the turbine's runner 32 rotates, at least one of the following to increase the turbine's efficiency, and thus the amount of power generated by the turbine: 1) the speed of the turbine's runner 32 by adding or subtracting an electric load to the generator 28 thereby increasing or decreasing the generator reaction torque presented to the runner, 2) the flow of liquid 18 through the runner 32, or 3) both.

For example, in this and other embodiments, the control circuits 67 and 69 include a sensor that measures the static pressure of the liquid at the intake 26, and another sensor 62 that measures the pressure of the liquid flowing through the penstock 24. The control circuits 67 and 69 also include a controller that receives a signal from each of the sensors that represents the static pressures, then compares this signal with a predetermined, desired signal, and determines whether or not the static pressure and flow rate, respectively, dropped, rose or remained the same. Based on this determination and as discussed in greater detail in conjunction with FIG. 5, the controller then instructs either the valve 48 to move to increase or decrease the current flow of liquid through the penstock 24, or an electric load 66 to be added to or removed from the generator, or both.

FIG. 5 shows a process for controlling the efficiency of the turbine 22 of the power generation system 16 shown in FIG. 1, according to an embodiment of the invention. In some cases flow will be controlled by both speed adjustment and gate adjustment to satisfy regulatory requirements, e.g., to maintain a prescribed minimum head water elevation and flow over a dam. Turbine-generator speed may then be controlled to attain maximum efficiency at this prescribed flow. Control of the flow may be implemented in closed loop fashion with head water elevation as a feedback input. Speed for optimum efficiency might be determined by polynomial formula or look up table with flow as the input and speed set point as the output. Speed might be fine-tuned for best efficiency by a trial-and-error "hill climbing" procedure that seeks maximum power output by incremental changes in speed. Coordination of flow and speed control operations may be achieved by generous spacing of their control bandwidths. For example, flow control loop bandwidth could be much smaller than that of speed control. Other aspects of control include prediction and avoidance of potential cavitation conditions by observation of runner outlet pressure and water temperature The process shown in FIG. 5 is performed by the control circuit 30 and allows the system 16 to modify the turbine's performance while the turbine 22 powers the generator 28, to increase the efficiency at which the turbine extracts energy from the flowing liquid 18 (FIG. 1).

For example, in this and other embodiments the process begins with step 70 in which the control circuit 30 monitors the efficiency of the turbine as previously discussed. If the control circuit 30 determines that the turbine 22 is operating outside of its range of desired efficiency, then the control circuit 30 first determines at step 72 whether the current efficiency of the turbine 22 is greater than or equal to a predetermined offset from the desired efficiency (here the offset is 85%). If the current efficiency is greater than or equal to 85%, then the control circuit 30 determines at step 74 whether the turbine's hub 34 (FIG. 1) is rotating faster than desired. If the hub 34 is, then the control circuit 30 at step 76 increases the electric load 66 (FIG. 2) to the generator 28 to resist the rotation of the generator's rotor, and thus slow the rotation of the turbine's hub 34. Then, the control circuit 30 resumes monitoring the efficiency of the turbine to determine whether additional modifications should be made. If the hub 34 is rotating slower than desired, then the control circuit 30 reduces the generator 28 electric load which currently has an electric load 66 coupled to it. If the generator 28 does, then at step 80 the control circuit 30 reduces or removes the load 66. If the generator 28 does not currently have an electric load 66, then at step 82 the control circuit determines whether the valve 48 (FIG. 1) is fully open such that the liquid's flow rate through the penstock 24 cannot be increased. If the valve 48 is fully open, then at step 84 the control circuit generates and displays a message that the turbine 22 or other component of the system 16 should be modified to increase the turbine's efficiency. If the valve is not fully open, then at step 86, the control circuit 30 further opens the valve 48 to increase the liquid's flow rate through the turbine 22.

Returning to step 72, if, however, the current efficiency is less than the predetermined offset from the desired efficiency (here the offset is 85%) then at step 88 the control circuit 30 determines whether the turbine's hub 34 is rotating faster than desired. If the hub 34 is, then at step 90, the control circuit 30 closes the valve 48 (or gate) to decrease the liquid's flow rate through the turbine 22. If the hub 34 is rotating slower than desired, then the control circuit 30 determines at step 92 whether the generator 28 currently has an electric load 66 coupled to it. If the generator 28 does, then at step 94 the control circuit 30 reduces or removes the load 66. If the generator 28 does not currently have an electric load 66, then at step 96 the control circuit 30 determines whether the valve 48 or gate is fully open. If the valve 48 or gate is fully open, then at step 98 the control circuit 30 generates and displays a message that the turbine 22 or other component of the system 16 should be modified to increase the turbine's efficiency. If the valve 48 or gate is not fully open, then at step 100 the control circuit 30 further opens the valve 48 or gate to increase the liquid's flow rate through the turbine 22.

FIG. 6 shows a perspective view of a portion of a hub 34 of the turbine 22 included in the power generation system 16 shown in FIG. 1, according to an embodiment of the invention. And, FIG. 7 shows a blade 36 releasably mounted to the hub 34 such that one can manually adjust the pitch of the blade 36 in about two-degree increments within a range of about twenty-four degrees, according to an embodiment of the invention. The hub 34 releasably couples the turbine blade 36 (here four) to the shaft (shown in FIG. 1 but not labeled) of the turbine's runner 32 that transmits the rotation of the turbine's runner 32 to the generator 28. With the hub 34, one can quickly and easily adjust the pitch of the turbine blades 36 designed to efficiently extract energy from one specific range of flow conditions for a different specific range of flow conditions without removing the hub from the shaft (see FIG. 7). Also with the hub 34, one can quickly and easily replace one or more turbine blades 36 designed to efficiently extract energy from one specific range of flow conditions with other blades 36 designed to efficiently extract energy from a different specific range of flow conditions.

In this and other embodiments, the hub 34 of the turbine 22 includes two halves. The upper half 110 is a removable half shown in FIG. 6. The lower half (not shown in FIG. 6) is the portion of the runner 32 that the upper half 110 mounts to releasably couple the blades 36 to the runner 32. Thus, the face of the hub's second half mimics the face 112 of the hub's first half 110. To releasably couple the upper half 110 to the lower half, the turbine shaft (not shown) is inserted through the hole 114 and the surface of the upper half opposite the surface 112. Both the hubs and blades are held onto the shaft with a tapered locking mechanism (Ringfeder or similar).

The hub 34 also includes a receptacle 116 (only half of the receptacle 116 shown) that may be configured as desired to hold a blade 36. For example, in this and other embodiments the hub 34 includes four receptacles 116, and each receptacle 116 includes a cavity 120 and two bores 122a and 122b (for clarity only one of the four receptacles includes a label for the cavity and bores). The bores 122a and 122b are sized and configured to hold respective portions of the blade 36 and carry much of the bending and bearing loads experienced by the blade 36 while it extracts energy from flowing liquid.

The cavity 120 is shaped and sized to hold a root (shown in FIG. 8) of a blade 36. The cavity 120 thus prevents the blade 36 from moving in the directions indicated by the arrow 124*b*. The blades are mounted by means of bolts and "dogs" to allow the blade pitch to be easily changed in about two-degree increments using the bolts and "dogs" and not requiring that the hub be removed from the shaft.

FIG. 8 shows a perspective view of a turbine blade 36 of the turbine 22 included in the power generation system 16 shown in FIG. 1, according to an embodiment of the invention. The blade 36 extracts energy from flowing liquid and rotates the turbine's runner 32.

Because the power generation system 16 is designed to generate power from a range of flow conditions that typically exceeds the specific range of flow conditions for a turbine 22 using a specific blade 36, the system 16 may include two or more sets of blades 36 each designed to extract energy from a specific range of flow conditions that is included in the range of flow conditions experienced by the system 16 at the specific dam or river site where the system 16 is used. The blade 36 shown in FIG. 8, is just one example of several different blades 36 that the turbine 22 may include.

In this and other embodiments, the blade 36 includes a body 130 that the liquid contacts when the blade 36 extracts energy from a flowing liquid, and an anchor 132 that the hub 34 holds when the blade 36 is releasably coupled to the hub 34. The body 130 may include any desired profile that extracts energy from the liquid flowing past it without causing cavitation—the formation of bubbles or voids in the liquid adjacent the body 130. As shown in FIG. 5, when the blade is releasably coupled to the hub 34, the profile of the body 130 is configured to rotate the blade 36, and thus the hub 34, about the axis 134 in the direction indicated by the arrow 136 as liquid flows in the direction indicated by the arrow 138. In this configuration, the profile of the body 130 is configured to extract a maximum amount of energy from flowing liquid when the pitch of the body 130 or the body's angle of attack is about 16 degrees. In other embodiments, profiles of the body 130 may each be configured to extract a maximum amount of energy from flowing liquid when the specific pitch of the body 130 is greater than four degrees and less than 28 degrees.

In this and other embodiments, the anchor 132 includes a root 140, and two shafts 142*a* and 142*b*. The shafts 142*a* and 142*b* are sized and configured to be held by the hub's bores 122*a* and 122*b*, respectively. Similarly, the root 140 is sized and configured to be held by the hub's cavity 120. When the blade 36 is releasably coupled to the hub 34, and thus the runner 32, the axis 144 is collinear with the axis 118 (FIG. 4) and perpendicular to the axis 134.

FIG. 9 shows a perspective view of a portion of the self-cleaning, screened U-channel trench 40 included in the intake 26 of the power generation system 16 shown in FIG. 1, according to an embodiment of the invention. The screened U-channel trench 40 captures liquid 150 flowing over a dam's crest (shown in FIG. 1), or liquid flowing in a river whose bed is gravel or bedrock, and directs the liquid 150 toward the adjustable length pipe 42 (FIG. 1) and eventually the turbine 22 (FIG. 1) located inside the pressurized forebay 46 (FIG. 1). The screened U-channel trench 40 is similar to a Tyrolean weir, and allows debris, such as leaves and sticks, as well as fish and excess liquid 152 to pass over the dam without being captured and directed toward the turbine 22.

The U-channel trench 40 may be fastened to the dam 20 (FIG. 1) as desired. For example, in this and other embodiments the screened U-channel trench 40 is fastened to the crest of the dam 20 by one or more hangers 154, such that the trench 40 is tilted downstream, i.e. the edge 156 is lower than the edge 157. The hanger can be the entire length of the U-channel, or several narrow hangers 154. The hanger 154 contacts the top of the dam and supports the trench 40 on the downstream side of the dam at the level of the dam's crest. The hanger 154 is sized and configured to support the trench 40 when the trench is full of liquid 150 and a substantial amount of liquid 152 flows over the trench 40. In addition, the hanger 154 may be made of any desired material, such as steel. In addition to the hangers, the U-channel trench 40 will be bolted directly to the dam 20, or the trench may rest on top of a shelf or vertical supports that are anchored to or near the dam 20.

The U-channel trench 40 may be configured as desired. For example, in this and other embodiments the U-channel trench 40 includes a cross-section in the shape of a slanted or tilted "U", and a screen 158 that covers the top, open end of the U. The U portion of the trench may be made of any desired composite, metal and/or concrete that resists biofouling, abrasion and freezing in cold temperatures, and is made of multiple, standard length sections that are coupled together to form a U-channel trench having the length desired for a particular site. The screen 158 is also made of any desired material that resists biofouling, abrasion and freezing in cold temperatures, and is configured as a grate, not a wire mesh, that includes openings 160 (only three labeled) sized as desired to allow the liquid 150 to flow into the trench 40 while preventing debris from entering the trench 40. Similar to the U portion of the trench 40, the screen 158 is also made of multiple, standard length sections that may or may not be coupled together when two or more sections are coupled to a respective U section to form the trench 40.

The U-channel trench 40 also includes a mechanism to clean sediment and other fine debris that enters and is trapped on top of the screen 44. For example, in this and other embodiments, the mechanism includes a narrow perforated pipe 162 that is about 1.5 inches in diameter, disposed in the U portion of the trench 40. To clean the screen 44, the turbine is shut off and, air 164 is forced into the pipe 162 and expelled into the U portion of the trench 40 through the perforations 166 (only three labeled) in the pipe 162. As the air enters the U portion via the perforations, the air dislodges sediment and any other debris that has gathered on top of the screen and sends it over the dam 44. The flowing liquid 150 also carries the sediment and fine debris into the forebay 46 where it settles to the forebay's bottom and may be removed from the forebay 46 via a hatch or door (29 in FIG. 1).

FIG. 10 shows a perspective, cross-sectional, partial view of a penstock 170, according to another embodiment of the invention. The penstock 170, includes a guide vane 172 (here seven guide vanes) located just upstream from the runner's hub 174 and blades 176, that direct the flow of liquid 178 to rotate (swirl) about the axis 180 before the flow 178 contacts the blades 176. The guide vanes 172 provide a tangential component of flow which allows the turbine blades 176 to more efficiently extract energy from the flow.

By swirling the flow 178 before the flow 178 contacts the blades 176, one can modify the blades 176 angle of attack in the flow 178, and thus allow the turbine blades 176 to efficiently extract energy from the flow 178 when the flow slows down. Because the pitch or angle of attack of blade 176 is not adjustable by clocking or rotating the blade 176 relative to the hub 174, the guide vane 172 offers a way for one to change the angle of attack of the blade 176 when flow through the penstock slows.

The guide vanes 172 may be held upstream from the blades 176 as desired; and may be configured as desired to provide the desired amount of swirl for a specific speed of the flow 178. For example, in this and other embodiments the seven guide vanes 172 are fixed to a section 182 of the penstock 170 and may not be rotated or clocked relative to the axis 180 to increase or decrease the amount of swirl that they generate in the flow 178. To change the amount of swirl, one replaces the section 182 with another section that includes one or more guide vanes 172 configured to provide the correct amount of swirl for the speed of the flow 178 and the head of the site. In this manner, the penstock 170 can be further modified to not include a guide vane 172 by replacing the section 182 with another section that has the guide vane 172 omitted. Such a substitution is desirable when the flow through penstock has the conditions that the turbine blades 176 are designed for, and with the ability to add guide vanes 172 to the penstock 170, one can use the blades 176 in flows 178 whose conditions would otherwise not allow efficient energy extraction.

Other embodiments are possible. For example, the guide vanes 172 may be releasably coupled to the section 182 to allow one to use different guide vane configurations with the same section 182. As another example, the guide vane 172 may be fixed or releasably coupled to the housing 184 of the shaft that couples the turbine to the generator.

Each of FIGS. 11A and 11B shows a partial cross-sectional view of yet another power generation system 190, according to yet another embodiment of the invention. The power generation system 190 is designed to generate power from a flow 192 having very low head (here about seven feet) and includes an intake 194 that may be quickly and easily modified to increase the head of the flow. FIG. 11A shows a partial cross-sectional view of the system 190 with the intake 194 not modified, and FIG. 11B shows a partial cross-sectional view of the system 190 with the intake 194 modified.

The power generation system 190 is similar to the power generation system 16 (FIG. 1) previously discussed except that the intake 194 is different than the intake 26 (FIG. 1). The intake 194 does not include a U-channel trench 40 (FIG. 1), and includes a forebay 196 that is not pressurized. In this and other embodiments, the forebay 196 includes a screen 198 that allows the liquid 192 to flow into the forebay 196 while preventing debris from entering the forebay 196, and that is pivotable relative to the forebay's body 200 to increase the head of the liquid 192 flowing through the guide vane 182 and the turbine's runner 204. By doing this, the turbine's runner 204 can extract more energy from the flowing liquid 192 to allow the generator 206 to generate more power.

In this and other embodiments, the screen 198 includes a skirt 208 that extends from the periphery of the screen 198. The skirt 208 seals against and engages the forebay's body 200 when the screen 198 is pivoted as shown in FIG. 11B. By sealing against and engaging the forebay's body 200, the skirt 208 effectively raises the top of the forebay 200 and thus the liquid's level in the forebay 196. This, in turn, increases the head of the liquid 192 flowing through the penstock 202 and the turbines runner 204

The screen 198 also made of any desired material that resists biofouling, abrasion and freezing in cold temperatures. For example, in this and other embodiments, the screen is made of a composite and is configured as a grate that includes openings sized as desired to allow the liquid 192 to flow into the forebay 196 while preventing debris from entering the forebay 196.

FIG. 12 shows a perspective view of another power generation system 220, according to another embodiment of the invention. The system 220 is similar to the power generation system 16 (FIG. 1) except that the intake 222 does not include a pipe to connect the U-channel trench 224 to the forebay 226, and the forebay 226 is not pressurized. The valve 228 controls the amount of liquid 230 allowed to flow through the penstock 232 and turbine's runner 232. The generator 234 generates power from the energy extracted from the flow 230 by the turbine's runner 232, and the power converter 236 regulates speed and transforms the power into AC power that a local utility's grid can readily accept and distribute. The power generation system 220 may be used to generate power from flow having conditions that range between fifty feet of head or less, and 300 cfs or less.

FIG. 13 shows a perspective view of another power generation system 240, according to another embodiment of the invention. The system 240 is also similar to the power generation system 16 (FIG. 1) except that penstock 242 lies at an angle that is not ninety degrees relative to the horizon. More specifically, the penstock 242 and thus the generator 243 and turbine (not shown for clarity along with other components of the system) lie at an angle that is about 45 degrees relative to the horizon. In operation, liquid 244 flows through the screen 246 and enters the forebay 248. From the forebay 248 the liquid flows through the penstock's entrance 250, through the penstock 242 and turbine's runner, and then exits the system 240 through the exit 252. The system 240 may be used to generate power from flow having conditions that range between fifty feet of head or less, and 300 cfs or less.

FIG. 14 shows a perspective view of still another power generation system 260, according to another embodiment of the invention. The system 260 is also similar to the power generation system 240 (FIG. 10) and 16 (FIG. 1) except that the intake 262 includes a spiral case 268 similar to those frequently found in conjunction with Francis or Kaplan turbine, and guide vanes 270 (eleven shown but only two labeled for clarity) to enable an even entrance in the liquid's flow 272 as the flow 272 enters the penstock 274. In operation, liquid 272 flows through the screen 276 and enters the forebay 278. From the forebay 278 the liquid flows through the pipe 280, through the spiral case 268, through the penstock 274 and turbine's runner (not shown), and then exits the system 260 through the exit 282. The pipe 280 includes a trap 284 to trap sediment and other debris in the liquid before the liquid enters the penstock 274. To clean the trap 284 one opens the door 286 to remove the sediment and debris. The system 260 may also be used to generate power from flow having conditions that range between fifty feet of head or less, and 300 cfs or less.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system for generating power from a flow of liquid having at most fifty feet of head and a flow rate of at most 300 cubic feet per second, the system comprising:
   an axial-flow turbine having a runner operable to receive a flow of liquid, the runner includes a hub and a plurality of blades, each blade releasably coupled to the hub and each blade:
      being configured to extract energy from the flow of liquid by rotating the hub when the flow of liquid contacts the blade, and
      having a pitch that is adjustable;
   a penstock operable to direct a flow of liquid toward the runner, the penstock having a length that is adjustable;
   an intake operable to direct a flow of liquid into the penstock;
   a generator coupled to the hub of the turbine's runner and operable to generate electric power from the rotation of the turbine's hub; and
   a control circuit operable to determine changes in the flow of liquid and in response to a determined change in the flow, modify at least one of the following:
   the speed of the axial-flow turbine's hub, and
   the flow of liquid that the runner receives.

2. The system of claim 1 wherein the axial-flow turbine includes a Kaplan turbine.

3. The system of claim 1 wherein the runner includes four blades.

4. The system of claim 1 wherein each of the blades is designed to extract energy from a flow of liquid having seven feet of head and a flow rate of 100 cubic feet per second.

5. The system of claim 1 wherein the pitch is about sixteen degrees.

6. The system of claim 1 wherein:
   each of the turbine's blades includes a root, and
   the hub includes a plurality of receptacles, each corresponding to a respective one of the plurality of blades, each receptacle configured to hold the root of its respective blade and not allow the blade to move outward relative to the hub and to lock the blade into one of a plurality of pitch angles covering a range of twenty-four degrees, each two degrees different than an adjacent pitch angle, without having to remove the hubs or blades from the shaft.

7. The system of claim 1 wherein the penstock includes one of:
   a guide vane configured to rotate the liquid flowing toward the runner, about a longitudinal axis of the penstock; or a cross-sectional area that remains the same throughout the length of the penstock.

8. The system of claim 1 wherein the penstock lies in one of a vertical position and a substantially horizontal position.

9. The system of claim 1 wherein one of:
   the intake includes a valve operable to modify the flow of liquid that the runner receives; or
   the intake includes a forebay operable to hold and calm the liquid before the liquid enters the penstock.

10. The system of claim 1 wherein the intake includes a screened U-channel trench that is configured to be easily positioned using a mounting system in a spillway of a dam or adjacent a crest of dam and operable to direct some of the liquid that flows over the spillway or crest, respectively, toward the penstock.

11. The system of claim 1 wherein the intake includes a forebay operable to hold and calm the liquid before the liquid enters the penstock and the forebay is either pressurized or unpressurized.

12. The system of claim 1 wherein the intake includes a powerhouse that:
   contains the system while the system is transported toward a power-generation site, and
   includes all the components-including a forebay that holds and calms the liquid before the liquid enters the guidevanes and turbine.

13. The system of claim 1 wherein the screened intake includes an exit configured to direct liquid into the penstock while maintaining laminar flow.

14. The system of claim 1 wherein the runner's hub includes an upper half and a lower half, wherein the upper half is slidable along a shaft of the turbine toward and away from the lower half to releasably couple the blade to the runner.

15. The system of claim 1 wherein the generator is one of:
   operable to generate electric power having an alternating current; and
   outside the flow of liquid through the axial-flow turbine.

16. The system of claim 1 wherein the control circuit is one of:
   operable to determine a change in at least one of the following: the static pressure of the flow of liquid and the rate of the flow of liquid;
   operable to determine a change in at least one of the following: the static pressure of the flow of liquid and the headwater elevation;
   adds an electrical load to the electric power generated by the gene to modify the speed of the axial-flow turbine's hub;
   operates a valve included in the system's intake to increase or decrease, respectively, the flow of liquid that the runner receives;
   modifies the speed of the axial-flow turbine's hub in response to changes in the flow of liquid to increase the turbine's efficiency;
   modifies the flow of liquid that the runner receives in response to changes in the flow of liquid to increase the turbine's efficiency;
   modifies the flow of liquid that the runner receives in response to changes in the headwater elevation to increase the turbine's efficiency; and
   includes an anti-islanding circuit operable to isolate the system from a power grid while the power grid isn't supplying power to an islanded network of loads.

17. The system of claim 1 further comprising a converter operable to convert electric power generated by the generator into electric power having an alternating current.

18. A method for generating power from a flow of liquid having at most fifty feet of head and a flow rate of at most 300 cubic feet per second, the method comprising:
   positioning a turbine system in a flow of liquid having at most fifty feet of head and a flow rate of at most 300 cubic feet per second, the turbine system including an axial-flow turbine having a runner that includes a hub and a plurality of blades, each blade releasably coupled to the hub and each blade having a pitch that is adjustable;
   directing, with an intake of the turbine system, a flow of liquid into a penstock of the turbine system;
   directing, with the penstock, the flow of liquid from the intake toward the runner of the axial-flow turbine;
   rotating the runner's hub with the flow of liquid;

generating power with a generator that is included in the turbine system and coupled to the runner's hub;

monitoring the flow of liquid through the intake for a change in the flow; and in response to a change in the flow, modifying at least one of the following:
the speed of the axial-flow turbine's hub, and
the flow of liquid that the runner receives.

19. The method of claim 18 wherein the method further comprises one of:
monitoring the flow of liquid through the penstock includes monitoring at least one of the following: the static pressure of the flow of liquid and the rate of the flow of liquid;
modifying the speed of the axial-flow turbine's hub includes adding an electrical load to the electric power generated by the generator;
modifying the speed of the axial-flow turbines hub includes adding an electrical load to the electric power generated by the generator;
modifying the sped of the axial-flow turbine's hub occurs in response to a change in the flow of liquid to increase the turbine's efficiency; and
modifying the flow of liquid that the runner receives occurs in response to a change in the flow of liquid, to increase the turbine's efficiency.

20. The method of claim 18 further comprising one of:

manually adjusting the pitch of each of the runner's blades to extract much of the energy from a flow of liquid having a specific head that is under fifty feet and a specific flow rate that is under 300 cubic feet per second; and monitoring the power generated by the turbine system for the presence of an islanding condition, and, in response to the presence of an islanding condition, disengaging the power generated by the turbine system from a power a grid.

* * * * *